Jan. 14, 1969  E. WEINSTEIN  3,421,456
POWERED FOOD PRODUCT SCOOPER
Filed Feb. 13, 1967
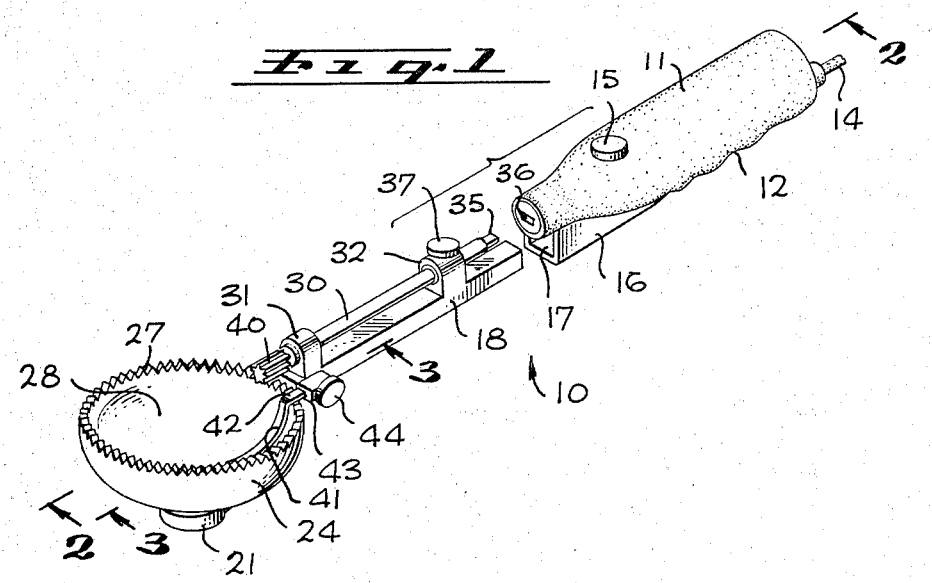
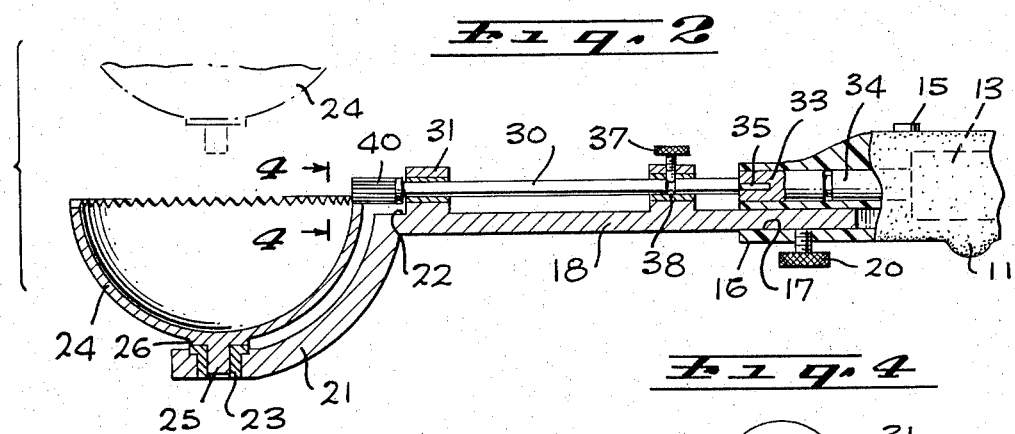
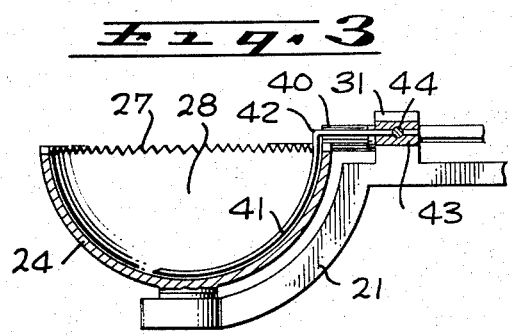
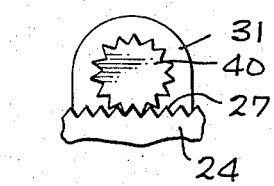
EDWARD WEINSTEIN
INVENTOR.
BY Roger A. Marrs

United States Patent Office 3,421,456
Patented Jan. 14, 1969

3,421,456
POWERED FOOD PRODUCT SCOOPER
Edward Weinstein, 20310 Clark St.,
Woodland Hills, Calif. 91364
Filed Feb. 13, 1967, Ser. No. 615,767
U.S. Cl. 107—48                14 Claims
Int. Cl. A47j 43/28

ABSTRACT OF THE DISCLOSURE

A powered scooper is disclosed having a handle for housing an electric motor for rotatably driving a bowl member via a drive shaft rotatably mounted on a body extending from the handle and a pinion gear carried on the end of the drive shaft in mesh with a ring gear formed about the annular peripheral edge of the bowl member. The ring gear functions as a cutting edge for separating a portion of the food product from its surrounding bulk.

BACKGROUND OF THE INVENTION

Field of the invention

This invention relates to food product dispensing equipment and, more particularly, to a novel hand-held powered scooper for effecting the removal of a quantity of food product from its surrounding bulk stored in a container.

Description of the prior art

In the food products industry, it is the customary practice to store quantities of frozen food products, such as ice cream, for example, in cylindrical containers designed to hold approximately one gallon of the food product. The containers are generally stored in large refrigeration units so that the food product not only is maintained fresh but becomes hard. At such subsequent time that the containers of hardened frozen food product are delivered to commercial food stores, restaurants, ice cream parlors or the like, the problem is encountered of removing the frozen food product from its container so that the product may be dispensed to the consumer in a dish, confectionary cone, glass etc.

To effect the removal of such hardened food product from its container, a variety of hand implements have been employed which are physically forced and manipulated into the food product by the sheer muscular action of the user so that a portion of the product is separated from the bulk and subsequently dispensed in accordance with the user's requirement. Some prior implements such as spades and scoopers employ thermal means for assisting in accomplishing removal of the product while others often employ sharply tapered perihperal edges formed on the bowl member of the scooper or spade to separate the desired portion of the product from the bulk. However, difficulties and problems have been encountered when employing these conventional implements which stem largely from the fact that physical effort is required by the user to forcibly urge the scooper bowl member or spade edge into and through the product material. Generally, extensive manipulation of the implement is required by the user. Such a requirement is extremely tiring, especially if repeated product removing procedures are experienced, and generally, the arm muscles of the user are greatly taxed. This is a great restriction to certain persons such as children and food industy workers who are compelled to use these conventional implements.

Summary of the invention

Accordingly, the novel powered scooper of the present invention obviates the difficulties enrountered by prior food dispensing implements by providing an electrical power source for rotating a scooper bowl member having an irregular or toothed annuler perihperal edge which cuttingly engages with the desired portion of the food product to be separated from the surrounding bulk material. The power source is push-button operated so that the bowl rotation is under control of finger operation by the user so that regardless of how firm or hard the food product is packed, the powered bowl member will effect separation.

In one embodiment of the present invention, the powered scooper comprises a handle for housing a small electric motor which is operably connected to an elongated drive shaft rotatably carried by a body portion detachably coupled to one end of the handle. The body portion includes a cantilevered arcuate section on which a bowl member is rotatably mounted. The bowl member is formed with a plurality of teeth constituting a ring gear about its annular peripheral edge defining a circular opening into a bowl member cavity. A pinion gear is fixed on the end of the drive shaft which meshes with the ring gear for imparting rotary movement to the bowl member from the motor and drive shaft. Thereby, not only does the ring gear serve to effect rotation of the bowl member but the plurality of teeth operate as an annular cutting edge for separating a portion of the food product captured in the bowl member cavity from the surrounding bulk food product material.

An arcuate stripper blade is carried by the body portion and extends into the bowl member cavity so that when it is desired to remove the captured food product from the cavity, the bowl member may be rotated so that the food product will be separated from the inner surface of the cavity by the stripper blade.

Therefore, it is a primary object of the present invention to provide a novel powered scooper having an annular irregular peripheral edge for effecting the separation of a relatively hard food product from surrounding bulk material.

It is another object of the present invention to provide a novel frozen food product scooper having a rotatable bowl member which is driven by a motor means so as to effect powered rotation of the bowl member wherein the annular peripheral edge of the bowl member is formed with a plurality of gear teeth effective to remove a portion of the product from its surrounding bulk.

Another object of the present invention is to provide a novel powered scooper for effecting the removal of a portion of frozen food product having a powered rotary bowl member equipped with a stripper blade extending into the interior of the bowl member whereby rotation of the bowl member effects not only separation of a quantity of frozen food product from its surrounding bulk but, in cooperation with the stripper blade, effects the release of the captured food product portion from within the bowl member.

Yet another object of the present invention is to provide a novel powered scooper for removing a portion of frozen food product which is hand-held and push-button operated so that physical exertion by the user is eliminated and the removal of food product from a container greatly expedited.

Yet another object of the present invention is to provide a novel powered scooper which is inexpensive to manufacture and which is adapted to be readily disassembled for cleaning and maintenance purposes.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 1 is a perspective view of the novel powered food product scooper incorporating the present invention;

FIGURE 2 is an enlarged cross-sectional view of the powered scooper illustrated in FIGURE 1 as taken in the direction of arrows 2—2 thereof;

FIGURE 3 is a fragmentary view, in section, of the powered scooper as taken in the direction of arrows 3—3 of FIGURE 2; and FIGURE 4 is an enlarged sectional view of the drive mechanism employed in the powered scooper of FIGURE 2 as taken in the direction of arrows 4—4 thereof.

DESCRIPTION OF THE PREFERRED EMBODIMENT

Referring to FIGURES 1 and 2, the novel powered scooper is illustrated in accordance with the present invention and is shown in the general direction of arrow 10. The embodiment illustrated includes a handle 11 which is adapted to be held against the palm of the user's hand and includes a plurality of spaced indentations, such as represented by numeral 12, about which the fingers of the user's hand may be conveniently disposed. Handle 11 is employed to house an electrical motor 13 which may be of any conventional type that may be energized either by means of storage batteries or via a power cable 14 adapted to be plugged into a conventional wall socket. A push-button 15 is preferably carried on the upper side of the handle 11 in a convenient position for thumb operation so that the electric motor may be started and stopped upon the depression and release of the button, respectively.

Handle 11 includes a receiver 16 of square cross-section having an opening 17 leading therein so as to insertably receive one end of a body portion 18. Preferably, the body portion is of square or rectangular cross-section and one end thereof is adapted to be placed within the opening 17 of receiver 16 so that the body portion 18 is cantilevered outwardly from its supporting location on the handle. As shown more clearly in FIGURE 2, the body portion is releasably connected to the handle 11 by means of a screw 20.

The outwardly extending free end of the body portion 18 is integrally formed with an arcuate section 21 which extends downwardly from an upper surface 22 of the body portion 18. Near the end of the arcuate section 21 opposite to its end integrally formed with the body portion, a bearing means 23 is mounted so as to rotatably receive and mount a bowl member 24. Bowl member 24 includes a fixed shaft 25 which is seated in the bearing 23 wherein the outer surface of the bowl member surrounding shaft 25 is spaced apart from the bearing 23 by means of a washer 26. By this construction, the bowl member 24 may freely rotate on bearing 23 as supported on the arcuate section 21. The bowl member is further provided with a plurality of teeth, such as is represented by numeral 27, which are formed in the annular peripheral edge of the bowl member defining an opening into a cavity 28 defined by the hemispherical inner surface of the bowl member. The plurality of teeth 27 are adapted to engage the food product when the scooper is forced into the food product material so that a portion of the material seats within the cavity 28 as the bowl member rotates. The plurality of teeth 27 serve to sever or separate the portion of the food product to be removed from its surrounded bulk.

In order to drive the bowl member 24, means are provided which comprise a drive shaft 30 rotatably mounted on projections 31 and 32 which are arranged in fixed spaced relationship on the top surface 22 of the body portion 18. One end of the drive shaft is adapted to be received into a chuck member 33 carried on the end of an armature shaft 34 forming a part of motor 13. Preferably, the drive shaft 30 includes a tongue 35 which is adapted to be insertably received within a chuck slot 36 of the chuck 33.

The drive shaft 30 is removably carried on the projection 31 and 32 by means of a screw fastener 37 which cooperates with an annular groove 38 provided about the shaft 30 so that when the screw 37 is tightened down, the shaft may rotate but will not move longitudinally from its mounting. It is to be understood that body portion 18 may be a solid block of plastic-like material and that the drive shaft may be rotatably mounted in the block along its entire length, if desired.

The end of shaft 30 opposite to its end coupling with motor 13 is provided with a pinion gear 40 projecting outwardly over a portion of the edge of the bowl member in close proximity to the projection 31. The teeth of gear 40 mesh with the plurality of teeth 27 so that the teeth 27 constitute a ring gear. Consequently, when push-button 15 is depressed, the electric motor 13 will cause rotation of shaft 30 and the bowl member 24 will rotate via the gear train comprised of pinion gear 40 and ring gear 27.

As shown more clearly in FIGURE 2, bowl member 24 may be readily removed from bearing 23 and arcuate section 21 as indicated in broken lines by effecting the loosening or removal of shaft 30 via its retention screw 37 so that pinion 40 is taken out of mesh with ring gear 27 which permits the bowl member 24 to merely be lifted upwardly so that disassembly is effected. As illustrated, disassembly can be achieved by means of set screw 20 which achieves the removal of the body portion 18 from handle 11, by set screw 37 which permits the drive shaft 30 to be disengaged with the motor 13 by moving the drive shaft longitudinally out of its mounting projections 31 and 32, and by merely lifting the bowl member 24 out of its rotatable seat in bearing 23.

Referring now in detail to FIGURE 3, the powered scooper of the present invention also includes an arcuate stripper blade 41 having a curvature corresponding to the contour of the hemispheric inner surface 28 of bowl member 24. The stripper blade downwardly extends into the cavity 28 of the bowl member in close proximity to the inner surface thereof from a base element 42 that is insertably received within a slot formed in a lateral projection 43 carried by the body portion 18 in close proximity to the shaft mounting projection 31. The stripper blade may be readily disassembled from the scooper by means of a retained screw 44 in a similar fashion as screw means 20. When the screw 44 is tightened, the stripper blade is held in position on the body portion so that the blade extends into the cavity 28 of bowl member 24.

Once the powered scooper has been used to separate a portion of the food product which is seated within the cavity 28 of bowl member 24, that portion of the food product may be readily dispensed from the scooper bowl member by powering shaft 30 so that the bowl member is rotated via the gear train whereby the stripper blade causes the food product within the cavity to separate from the bowl member whereupon the separated food product may be deposited or dispensed into a dish or confectionary cone.

Referring now to FIGURE 4, an enlarged view of the gear train is illustrated showing the teeth of pinion gear in mesh with the teeth of the ring gear 27. Therefore, as the drive shaft rotates pinion 40, a force will be imparted to bowl member 24 via the ring gear 27 so that the bowl member will rotate accordingly.

Therefore, it can be seen that the powered scooper of the present invention provides a novel means and apparatus for removing a portion of frozen or relatively hard food product from its surrounding bulk material. The removal is achieved without undue physical exertion by the user due to the fact that the teeth of the ring gear 27 adequately sever the material as the bowl is rotated.

Removal of the captured portion of the food product from the bowl member is also effected by the rotation thereof in cooperation with the stripper blade 41 so that the food product may be readily dispensed from the powered scooper. Disassembly of the various moving parts of the scooper is available by means of the set screws 20, 37 and 44 which permits the device to be taken apart for repair, maintenance and cleaning purposes.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:
1. A powered food product scooper adapted
to remove a portion of relatively hard food product from the bulk of the surrounding food product material comprising:
a handle enclosing an electric motor carried therein;
a rotatable bowl member having an annular peripheral edge formed with a plurality of teeth;
a body portion outwardly depending from one end of said handle including an arcuate section cantilevered from the free end thereof and having means for rotatably seating said bowl member on the extreme end of said arcuate section whereby said plurality of teeth lie substantially coplanar with the upper surface of said body portion; and
means operably coupling said electric motor to said bowl member for imparting a moving force to rotate said bowl member in response to operation of said electric motor whereby said plurality of teeth cuttingly engage with the food product portion desired to be removed.

2. The invention as defined in claim 1 wherein
said operable means connecting said electric motor to said bowl member includes a drive shaft rotatably carried on said body portion having one end thereof coupled to said electric motor and provided with a pinion gear on its other end drivingly engageable with said plurality of teeth which constitute a ring gear.

3. The invention as defined in claim 2 including
an arcuate stripper blade having one end thereof carried on the free end of said body portion and adapted to extend over said ring gear into the cavity of said bowl member in close proximity to the inner surface thereof.

4. The invention as defined in claim 3 including
screw means for releasably retaining said drive shaft on said body portion.

5. The invention as defined in claim 4 including
means for releasably coupling said one end of said drive shaft to said electric motor.

6. The invention as defined in claim 5 including
screw means for detachably connecting said body portion to said handle.

7. The invention as defined in claim 6 including
screw means for detachably coupling said stripper blade to said body portion.

8. The invention as defined in claim 1 wherein
said operable means comprises a drive shaft rotatably carried on said body portion and a gear means drivingly coupling said drive shaft to said bowl member wherein said plurality of teeth is adapted to engage the food product portion and to effect the removal thereof.

9. The invention as defined in claim 8 wherein
said gear means includes a pinion gear in mesh with a ring gear formed by said plurality of teeth on said annular peripheral edge of said bowl member.

10. The invention as defined in claim 1 including
an arcuate stripper blade having one end thereof detachably secured on said body portion and adapted to extend over said plurality of teeth into the cavity of said bowl member in close proximity to the inner surface thereof.

11. The invention as defined in claim 1 including
means for detachably connecting said body portion to said handle.

12. The invention as defined in claim 1 including
means for releasably retaining said coupling means on said body portion.

13. A powered food product scooper adapted to
remove a portion of food product from the bulk of the surrounding food product material comprising:
a handle enclosing an electric motor carried interiorly thereof having a dimensional configuration less than the dimensional configuration of said handle;
a rotatable bowl member having an annular peripheral edge formed with a plurality of teeth;
a body portion having an arcuate section cantilevered from the free end thereof and having means for rotatably seating said bowl member on the end of said arcuate section whereby the curvature of said bowl member matingly corresponds with the curvature of said arcuate section;
means detachably coupling the end of said body portion opposite to its end carrying said bowl member to said handle;
an arcuate stripper blade having one end thereof carried on said body portion and adapted to extend over said plurality of teeth into the cavity of said bowl member in close proximity to the inner surface thereof; and
means operably coupling said electric motor to said bowl member for imparting a moving force to rotate said bowl member in response to energization of said electric motor whereby said plurality of teeth cuttingly engage with the food product portion to effect the removal thereof.

14. The invention as defined in claim 13 including
a battery power source for said electric motor encased by said handle.

References Cited

UNITED STATES PATENTS

| | | | |
|---|---|---|---|
| 1,574,788 | 3/1926 | Brueseke | 107—48 |
| 2,412,050 | 12/1946 | Lawrence et al. | 107—48 |

WILLIAM I. PRICE, *Primary Examiner.*